Haraldur Asgeirsson
INVENTOR.

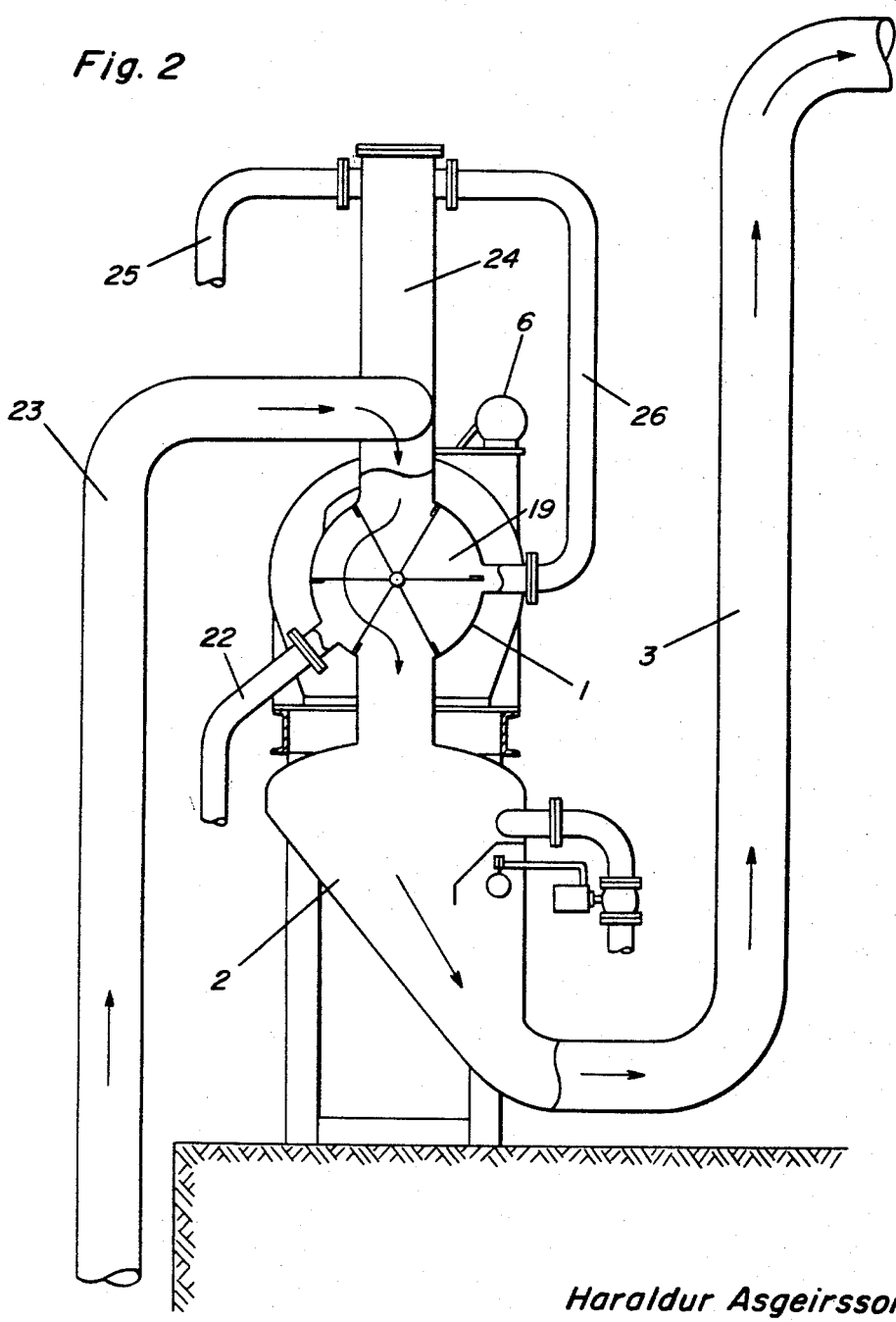

United States Patent Office 3,413,039
Patented Nov. 26, 1968

3,413,039
**TRANSPORT EQUIPMENT FOR FLUID MATE-
RIALS, GRAINY MATERIALS AND SMALL
FISH, SUCH AS HERRING**
Haraldur Asgeirsson, Aegissida 48, Reykjavik, Iceland
Filed May 18, 1966, Ser. No. 551,087
Claims priority, application Iceland, May 22, 1965, 1,488
21 Claims. (Cl. 302—14)

ABSTRACT OF THE DISCLOSURE

A fluent material handling apparatus including a pressurized chamber into whose upper portion fluent material to be conveyed is downwardly discharged in successive batches from a rotary pressure sealing transfer device disposed thereabove, said pressurized chamber including a lower material discharge outlet through which the material delivered into the upper portion of the pressurized chamber may be discharged by the pressurized atmosphere in the pressurized chamber and the pressure sealing transfer device including means by which a seal against the free flow of pressurized atmosphere from the pressurized chamber in a reverse direction through the pressure sealing transfer device is provided.

---

Figure 1:
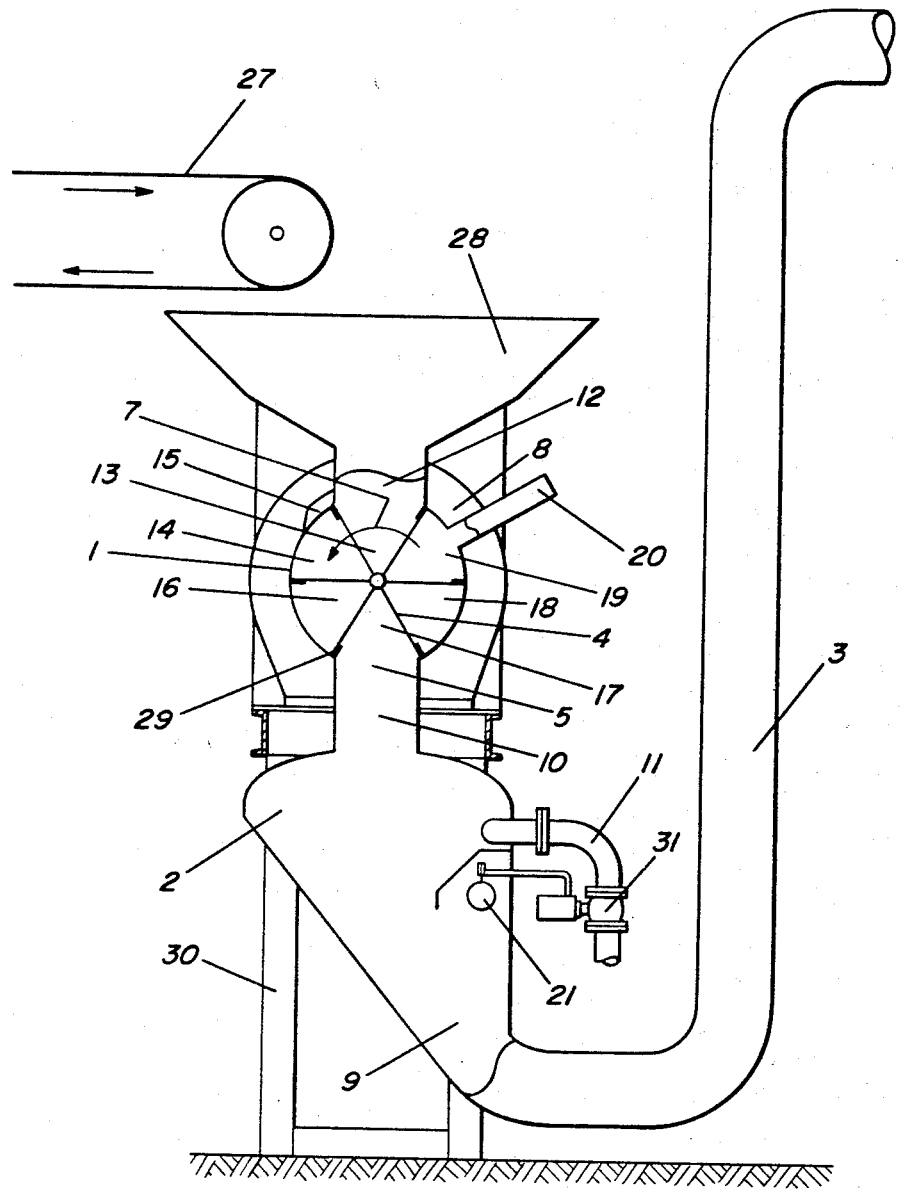

The invention concerns equipment for the transport of fluent materials, especially materials carried in liquids such as small fish from one place to another, especially upwards. The invention will in the following be described as being specifically adapted to convey small fish such as herring. However, the invention can be utilized to convey many other materials and things, which would be too cumbersome to describe here.

Present methods of conveying fish include the use of centrifugal fish pumps which suck and push the fish onwards and have no limited transport height. The fish is pumped with considerable quantities of water which is the necessary carrying media for the fish and also protects the fish from being bruised by the impellers of the pumps. However, centrifugal fish pumps have disadvantages in that they cause protein and fat to dissolve and wash away and up to a 10% loss may thus be suffered. In order to regain this loss, evaporation of the water must be effected.

The air-lift method is also a manner in which fish may be conveyed and is characterized by use of a long loop downwards whereby the material flows down one leg of the loop and up the other leg where air is injected so as to lighten the column and thus lifts the material. Because of the small difference of the densities a long loop is needed for a relatively short lift. In addition, it is necessary that the fish be emerged in water, which results in the same disadvantages as mentioned above.

A further method is the air sweep-method which uses a huge amount of air blown at a great speed through a pipe-line by which the fish is floated through the pipeline on the air. This method consumes great quantities of power.

Still another method is the vacu-lift method characterized by air being evacuated from a suction line which then fills up from the suction end with fish. The discharge end of the suction line is provided with equipment for forming an air seal while discharging fish, for instance an exchanger. Some water is necessary in this method to carry the fish, but the main disadvantage of the method is that the suction height is limited to less than 10 meters of which preferably two are needed to create speed of the fish in the pipeline.

Also, helical conveyors, piston pumps, and sliding vane pumps are used, which push the fish onwards, but they do not suck. However, these methods spoil the fish considerably and involve the use of equipment which is difficult to handle.

These known methods therefore all have their disadvantages, namely limited height of lift, mistreatment of the raw material, loss of material and excessive power requirements.

The main object of this invention is to provide equipment which can transport fish up to the desired height without bruising or mistreating the fish in a manner avoiding losses and the use of excessive power.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic view of a first form of the invention which may be used when the material to be conveyed is initially disposed above the invention; and FIGURE 2 is a schematic view of a second form of the invention which may be used when the material to be conveyed is initially disposed below the invention.

The first form of the invention illustrated in FIGURE 1 includes a piece of equipment which consists of a pressure line 3, leading from the bottom 9 of a pressure vessel 2 where the fish can flow by gravity to the pressure line 3. At the upper end of the pressure vessel 2 is an air-tight feeder 1 in the form of an exchanger through which the fish can flow into the pressurized vessel 2 without loss of pressure in the vessel.

The fish drop by gravity to the bottom of the pressure vessel 2 where the feed end 9 of the pressure line 3 is disposed. The air-pressure within the pressure vessel 2 pushes the fish through the pressure line 3 without considerable amount of air. If a liquid, instead of fish, is to be pumped, no air will be carried along with the liquid through the pressure line 3.

At the feeder end 10 of the vessel 2 some loss of air is unavoidable. This amount of lost air will be equal to the volume of the compartments 13 at that pressure under which the compression vessel 2 is placed unless there is a corresponding compression in the feeder 1 at the inlet thereof, it being more advantageous to pressurize the vessel 2 by compressed air from pipeline 11 provided from an air compressor.

The feeder exchanger 1 is composed of the plates 4 which are mounted on a journalled shaft 5 driven by a motor 6 in the direction indicated by arrow 7. The plates 4 seal between the shaft 5 and housing 8 of the exchanger 1 through which the shaft 5 is journalled. The fish are discharged downwardly from the feeder 1 into the upper portion of pressure vessel 2 and thereafter fall by gravity to the bottom 9 of the vessel 2 where they funnel into the pressure pipeline 3.

The pressure vessel 2 is composed of a simple steel container with an inlet 10 at the top, directly connected with the housing 8 of the feeder 1. The pressure vessel 2 is connected to an air-compressor (not shown) by the pipeline 11 through which the compressed air is fed into the vessel. The flow of compressed air is controlled by a valve 31 disposed in pipeline 11 and operated by a float 21 disposed within the vessel 2, the valve 31 closes when the level of fluid in the container is at a minimum and opens when the level of fluid rises. Also provided is a control (not shown) which stops the feeder 1 when the fluid level in the pressure vessel 2 reaches a predetermined maximum and starts the feeder when the fluid level drops below the predetermined maximum.

In operation, the fish are brought to the inlet of the feeder 1 where they fall down into the compartment 13 and rotate with it into position 14 while rubber fins 15 smother the surface of the compartment so that no fish can be caught between the compartment plates 4 and the housing 8. The compartment rotates onwards into the position 16 where it is closed and under normal airpressure. In position 17 the compartment opens into the pressure vessel 2 and the fish fall from the compartment down into the pressure vessel 2 and air under pressure from the pressure vessel 2 flows up into the compartment 17 which thereafter rotates to the closed position 18 under the same pressure as is in the vessel 2. In the subsequent position 19, the compartment is vented to the atmosphere through the opening 20.

When the fish have fallen into the funneling bottom 9 of the pressure vessel 2 they close the inlet end of the pressure pipe line 3, air tight.

The density of the fish is around 1.0 and therefore one atmosphere overpressure in the vessel is needed for every 10 m. the fish are lifted.

When the new compartment 16 full of fish opens into the vessel 2, substantially no change of pressure will result in the vessel and the fish and air exchange. The surface of the fish, however, in the pressure vessel 2 elevates and the fish could fill up the vessel 2 without increasing the pressure since the same amount of air has replaced the fish in the feeder compartment. In order to push the fish into the compression pipeline 3 it is therefore necessary that an amount of air be pumped into the compression vessel 2 equal to the amount of air exhausted through the feeder compartment in order to maintain the same surface level within the vessel 2 which level is used for automatically controlling the inlet of air. When the level of the herring has increased to the float 21 the latter rises and opens the valve 31 of the pipeline 11. As the level of fish in the vessel 2 lowers due to fish being forced through pipeline 3, the level of fish drops below the float 21 resulting in the valve 31 being closed.

If an empty compartment comes, no herring will fall down, but the compartment fills with air from the vessel 2 resulting in the air pressure within the vessel 2 dropping correspondingly and the herring dropping down the pressure line 3 dropping to reestablish the working pressure in the vessel 2 by elevating the level of fish in the vessel until it reaches the float 21 and the latter raises to again open the valve 31 so as to admit air under pressure from the pipeline 11 with the consequence that the fish level lowers again.

It is desirable that the volume of the pressure vessel 2 be relatively large compared to the compartment 16 of the feeder 1 in order to prevent the level of fish dropping down to the pressure line 3, even if one or two compartments 16 arrive empty of herring.

By adding a pressure line such as pressure line 22 in FIG. 2 with the same pressure as in the vessel 2 it is possible to fill the compartments with air in position 16 with the same pressure as is in the vessel without taking air from the vessel 2, resulting in no changes in the level of fish, although the compartments are coming empty of herring.

The equipment in accordance with this invention as illustrated in FIGURE 1 is located underneath the quantity of fish to be pumped or in combination with another equipment which can suck the herring or combine it with a suction vessel such as shown in FIGURE 2, where the equipment can not be positioned underneath the herring.

The equipment illustrated in FIGURE 2 includes the addition of a suction pipeline 23, suction vessel 24, vacuum line 25 which evacuates air from the suction vessel 24 and the suction line 26 which evacuates the feeder compartment 19.

This combined equipment in accordance with the invention has both suction and compression and therefore can be freely located between the ends, except that it has a maximum suction head of approximately 8 meters. On the other hand, the pressure phase may be as great as desired in order to obtain a high lift which is important when unloading a herring tanker where the fish is conveyed from the tanker up into the storage facilities of the processing plant, were the storage facilities often are at an elevation of 20–30 m.

FIGURE 1 illustrates, besides what above has been described, a conveyor band 27 which carries fish to the funnel 28. From there it flows into the fish pump, which is supported by the frame 30. Seals 29 are mounted on the plates 4 in order to maintain a seal between the plates 4 and the opposing inner surfaces of the housing 8.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:
1. A fluent material pumping apparatus for pumping fluent materials against gravity and friction, especially materials carried in liquids and that can be transported through a pipeline such as small fish, said apparatus including a pressure vessel (2) with an inlet opening (10) and a gravity outlet opening (9), a feeder (1) connected to the inlet opening (10) a generally constant diameter pipeline (3) having its inlet end connected to the outlet opening (9) of the vessel (2), the feeder (1) being statically airtight, and the pipeline (3) being preferably full of material and also practically airtight, said apparatus defining a trap between the outlet of said vessel (2) and the inlet end portion of said pipeline (3) whereby air compressed in the pressure vessel (2) is interlocked between the feeder (1) on one side and the material in the outlet pipe (3) on the other side, said pressure vessel being communicated with a source of gas under pressure for pumping gas into the pressure vessel (2) and pushing the material out through the outlet pipeline (3), and the material in the outlet pipeline (3) resting by gravity in said trap, the feeder (1) including movable compartments (13, 14, 16, 17, 18, 19) shiftable into loading positions for filling with material and unloading positions for discharge into the inlet opening (10) the pressure vessel (2), said compartments being operable to receive gas under pressure from said vessel (2) for replacing the material discharged therefrom whereby gas may move out from the compression vessel (2) so that with a steady exchange flow, consisting of small portions of material into the feeder (1) and steady flow of compressed gas, consisting of small portions of air out of the vessel (2), will pass through the feeder (1), a steady flow of material outwardly through the outlet pipe (3) being formed because of steady flow of compressed gas into the compression vessel (2) from said source, whereby the apparatus creates a steady flow of material from the feeding end of the feeder (1) to the outlet opening of the outlet pipe (3) against friction pressure head of the material in the outlet pipe (3) by work of the compressed gas and volumetric increase of the gas in the pressure vessel, said outlet pipe 3 being devoid of means for effecting a distinct zone of pressure differential in said pipe (3) between said outlet opening (9) and the outlet end of said pipe (3).

2. The apparatus of claim 1, including means operative to control the inlet of compressed gas from said source into said vessel (2) by the surface level of the gravitated material in the compression vessel (2) said gas inlet control means being operative to admit gas when the surface level has reached a certain maximum and to terminate the admittance of gas when the surface of the level has reached a certain minimum.

3. Equipment according to claim 2, and characterized in that that the feeder (1) comprises a rotary compartmented valve including a plurality of generally radial evenly large plates (4) which are fastened to a shaft (5)

journalled in a generally cylindrical housing (8) and which form preferably large compartments therebetween.

4. Equipment according to claim 3, and characterized in that that the shaft (5) of the feeder palve is horizontal and the feeder includes a feeding opening (12) vertical over the shaft (5) and an emptying opening (10) vertically under the shaft (5), so that the filling and emptying of the feeder (1) depends on the gravity of the material.

5. Equipment, according to claim 4, and characterized in that seal means (29) are provided for establishing a seal between the plates (4) and the feeder housing (8), said seal means (29) being carried by the plates (4).

6. Equipment according to claim 5, and characterized in that the feeder housing (8) is provided with rubber fins (15) operative to sweep off of the compartments (14) the amount of material, which is in excess of a full compartment.

7. Equipment according to claim 1, and characterized in that that the compression vessel (2) funnels down to the outlet opening (9) of the compression vessel (2).

8. Equipment according to claim 1, including means operative to vent the gas pressure from within compartment (19) into the ambient atmosphere intermediate the exchange of gas for material in said compartments and the reception of material into said compartments.

9. Equipment according to claim 1, including means for admitting gas under pressure equal to the pressure of gas in said vessel (2) into said compartments intermediate the intake of material into said compartments and the exchange of gas for material in said compartments, so that the volume of compartment (16) which is not filled with material, will fill with air of same pressure as in the vessel (2) in order to decrease the loss of air from the very vessel (2).

10. Equipment according to claim 1, and characterized in that that at the filling end (12) of the feeder (1) is a funnel (28), which directs the material towards the inlet opening (12) of the feeder (1).

11. Equipment according to claim 1, and characterized in that that the inlet opening (12) of the feeder (1) is connected to a closed suction vessel (24) including an opening connected with an inlet pipeline (23) for said material, the lower end of the inlet pipeline (23) being disposed in a quantity of said material under atmospheric pressure whereby suction of air from the suction vessel (24) will cause the material to be transported to be pushed under atmospheric pressure up through the suction line (23) and up into the suction vessel (24) for discharge into the inlet of the feeder the flow of material being continuous, once the air pressure of the suction vessel (24) has been relieved sufficiently for the material to glide up the suction line (23) with suitable speed.

12. A fluent material pumping apparatus including a gas pressurized chamber having an inlet, upstanding internal pressure withstanding and generally constant diameter conduit means including a lower end opening into a lower portion of said chamber, pressure sealing means including an outlet communicated with said inlet and an inlet adapted to receive fluent material to be pumped, said feed means including means operative to convey fluent material, such as quantities of water and small fish, from said feed means inlet to said pressure chamber inlet for discharge of fluent material thereinto while preventing free flow of gas outwardly of said pressure chamber through its inlet and said feed means, said apparatus defining a trap between said chamber outlet and a lower portion of said conduit means operative to interlock the pressure chamber between said feed means and the portion of said conduit means disposed downstream from said trap, said apparatus being devoid of pressure regulating means operative to effect a distinct zone of pressure differential between the outlet portion of said chamber and the adjacent portions of said conduit means, whereby material flowing from said chamber and into said conduit means may so flow at a substantially constant velocity and while under a substantially constant pressure, and said conduit means being devoid of pressure regulating means operative to effect a distinct zone of pressure differential in said conduit means intermediate its inlet end and its uppermost portion.

13. The combination of claim 12 wherein said lower end of said conduit means opens through and is of a horizontal cross-sectional area substantially equal to the horizontal cross-sectional area of the bottom of said pressure chamber.

14. The combination of claim 12 wherein said apparatus includes a source of gas under pressure generally equal to the pressure in said feed means inlet and said feed means includes means defining movable closed pocket means successively directly registrable with said feed means inlet for receiving fluent material therefrom by gravity, with said pressure chamber inlet for discharge of fluent material thereinto and with said source of gas under pressure before again registering with said feed means inlet, said feed means inlet being vented to the ambient atmosphere and said source of gas comprising the ambient atmosphere.

15. The combination of claim 12 wherein said apparatus includes a source of gas under pressure generally equal to the pressure in said feed means inlet and said feed means includes means defining movable closed pocket means successively directly registrable with said feed means inlet for receiving fluent material therefrom by gravity, with said pressure chamber inlet for discharge of fluent material thereinto and with said source of gas under pressure before again registering with said feed means inlet, an upstanding exterior pressure withstanding material feed conduit whose lower end is adapted to be communicated with the supply of fluent material to be pumped, a source of vacuum, a vacuum chamber communicated with said source of vacuum and into which the upper end of said feed conduit opens, said vacuum chamber including a lower outlet disposed below the upper end of said feed conduit and communicate with said inlet of said pressure sealing feed means, said source of gas comprising said source of vacuum.

16. The combination of claim 15 wherein said feed means includes means for pressurizing said closed pocket means intermediate registry of the latter with said feed means inlet and said pressure chamber inlet.

17. The combination of claim 16 wherein said means for pressurizing said closed pocket means includes means operative to increase the pressure in said closed pocket means to a pressure generally equal to the pressure in said pressure chamber.

18. The combination of claim 12 wherein said apparatus includes a source of gas under pressure generally equal to the pressure in said feed means inlet and said feed means includes means defining movable closed pocket means successively directly registrable with said feed means inlet for receiving fluent material therefrom by gravity, with said pressure chamber inlet for discharge of fluent material thereinto and with said source of gas under pressure before again registering with said feed means inlet, a source of gas under greater pressure than the pressure within said pressure chamber, said pressure chamber including means operative to alternately initiate and terminate communication of the interior of said chamber with said source of gas under greater pressure in response to the lowering and raising of the level of fluent material in said chamber below and above, respectively, a predetermined level.

19. The combination of claim 12 wherein said feed means includes a casing having a generally cylindrical cavity therein, a driven rotor journalled in said cavity including means defining a plurality of closed pockets comprising said pocket means spaced circumferentially thereabout, said feed means inlet including an upwardly opening passage in said casing whose lower end opens into said cavity and with which said pockets are registrable and said feed means outlet including an upstanding passage in said casing whose upper end opens into said cavity and with which said pockets are registrable.

20. The combination of claim 19 wherein said rotor is journalled for rotation about a horizontal axis and said pockets open generally radially outwardly of said rotor.

21. The method of elevating a column of fish in a generally constant diameter upstanding pipeline including an upper discharge end portion and a lower inlet end portion which curves upwardly into the lower end portion of a closed pressure vessel which funnels into said inlet end portion, said method comprising the step of introducing fish to be elevated into the upper portion of said vessel together with quantities of a conveyance liquid having generally the same specific gravity as said fish, such as water, introducing air into said vessel above the level of liquid therein, maintaining said level of liquid below and above predetermined upper and lower levels thereof, respectively, disposed above the lower end portion of said vessel, and maintaining said air under a pressure at least slightly greater than the head pressure in said pipeline above the liquid level in said vessel when said pipeline is in operation.

References Cited

UNITED STATES PATENTS

| 2,684,870 | 7/1954 | Berg | 302—53 |
| 2,960,245 | 11/1960 | Knapp | 302—49 |
| 3,287,068 | 11/1966 | Kimmerle | 302—14 |
| 2,666,671 | 1/1954 | Kimmerle | 302—14 |
| 2,739,845 | 3/1956 | Berg | 302—53 |

ANDRES H. NIELSEN, *Primary Examiner.*